Nov. 13, 1962   H. L. O'DONNELL   3,064,071
WIRING DEVICE

Filed Sept. 23, 1959   2 Sheets-Sheet 1

WITNESSES
John L. Healy, Jr.
C. F. Posessky

INVENTOR
Henry L. O'Donnell, Deceased
BY Mary E. O'Donnell, Executrix
BY
Donald Smith
ATTORNEY Nov. 13, 1962 H. L. O'DONNELL 3,064,071
WIRING DEVICE
Filed Sept. 23, 1959 2 Sheets-Sheet 2
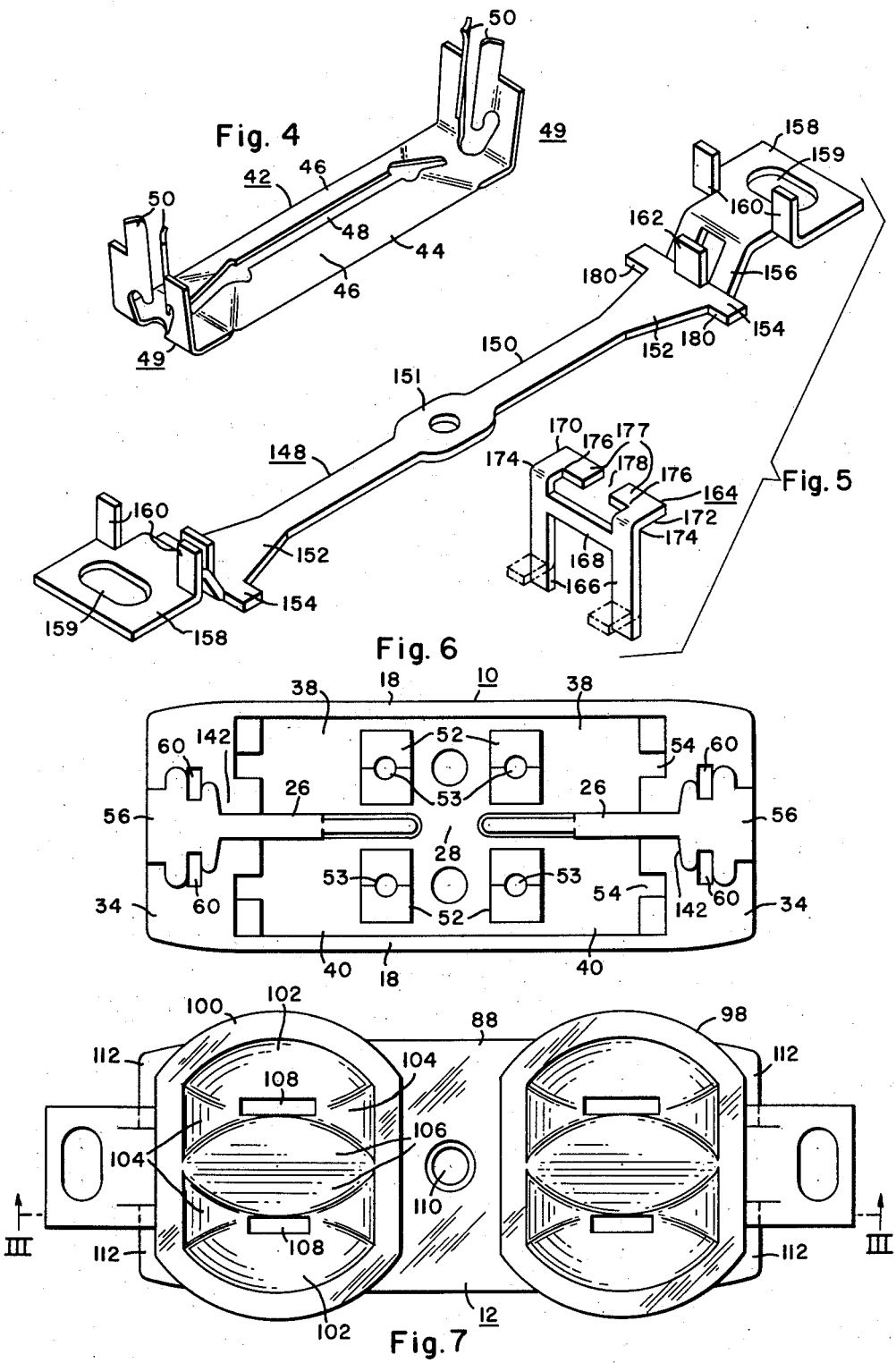

United States Patent Office 3,064,071
Patented Nov. 13, 1962

3,064,071
WIRING DEVICE
Henry L. O'Donnell, deceased, late of Bridgeport, Conn., by Mary E. O'Donnell, executrix, Bridgeport, Conn., assignor to The Bryant Electric Company, Bridgeport, Conn., a corporation of Connecticut
Filed Sept. 23, 1959, Ser. No. 841,721
4 Claims. (Cl. 174—53)

The present invention relates to a wiring device for connecting electric source energy to load apparatus, and, more particularly, to a wiring device which is adapted for connection to an electric source and for reception of plugs associated with the load apparatus.

In the manufacture of such devices, it is desirable to minimize the number of elements which cooperate to form the device and to simplify the arrangement of these elements without impairing the operation of the device. Attainment of this end affords minimization of manufacturing costs without a sacrifice of product quality. Thus, the elimination of securing hardware such as screws and rivets, often requisite to the interconnection of some or all the elements vital to the structure and operation of wiring devices, is directed toward this end. In U. S. Patent 2,890,265 of C. M. Smith, entitled Wiring Device, also assigned to the present assignee, there is decribed a wiring device in which such securing hardware is eliminated, and this application describes an improved wiring device which is directed toward eleminating such securing hardware.

It is, therefore, an object of the invention to provide a new and improved wiring device wherein a minimum number of component elements are assembled to form the device without resort to the use of separate securing elements such as screws and rivets and the like.

Another object of the invention is to provide a new and improved wiring device wherein assembly is facilitated through the use of a locking member which has integral means readily securable to base and cover parts of the device so that a clamped composite housing therefor is formed and is provided with mounting means.

It is yet another object of the invention to provide a new and improved wiring device which is adapted to operate as an electrical receptacle, wherein assembly is facilitated through the use of a locking member which has integral means readily secureable to base and cover parts so that a clamped composite housing for the receptacle is formed with provisions for mounting.

These and other objects within the scope of the invention will become more apparent upon study of the following detailed description of an illustrative embodiment of the invention as related to the accompanying drawings.

In the drawings:

FIG. 4 is an isometric view of a contact which is insertable in the duplex receptacle of FIGS 1 and 3.

FIG. 5 is an isometric view of an alternative embodiment of the locking member in accordance with the principles of the invention.

FIG. 6 is a top plan view of the base part of the duplex receptacle of FIG. 3.

FIG. 7 is a top plan view of the duplex receptacle of FIG. 3.

In accordance with the broad precepts of the invention, a locking member for a wiring device has integral means for cooperating with base and cover parts between which the locking member is extended longitudinally. Deformation of the integral means after coupling or enjoinment of the locking member with the base and cover parts affords clamping action so that a structurally rigid housing for a wiring device is formed. Additional adaptations on the locking member extremities provide for mounting the device.

In one exemplary embodiment of the invention, a wiring device is arranged in the form of a duplex receptacle. The locking member for the receptacle has integral tab-like projections, which projections are received by base and cover parts in a manner such that appropriate deformation of these projections locks the three members together to form a rigid receptacle housing. In an alternate embodiment of the invention, the locking member has integral projections, which are received by one part of the receptacle, and is structurally adapted for receiving auxiliary members which similarly have integral projections received by the remaining part of the receptacle. Appropriate deformation of all the projections in this alternate embodiment provides a firmly clamped receptacle housing.

Figure 3:
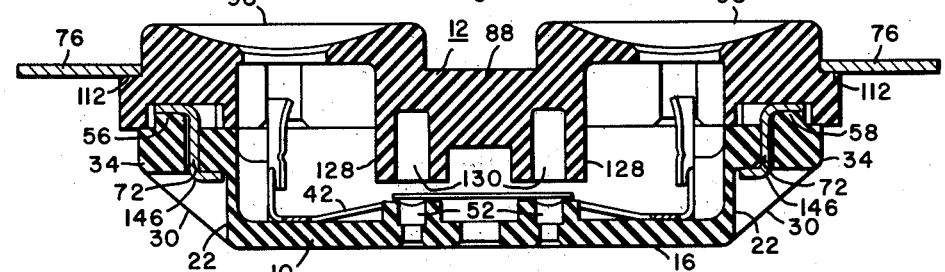
FIG. 3 is a sectional view of a fully assembled duplex receptacle, shown in part in FIG. 1, taken along the reference lines III—III of FIG. 7.

The detailed description of the duplex receptacle will now be presented with reference to the accompanying drawings. In FIGS. 3, 6, and 7, a housing for the receptacle comprises a base part 10 and a cover part 12, each preformed of suitable insulating material so that electrical action can occur within the receptacle in a manner consistent with safety and performance considerations. The base part 10 and the cover part 12 are assembled in clamped relationship through a locking member 14, which is punched or otherwise formed from a hard, resilient material such as sheet steel.

The base part 10, viewed most advantageously in FIGS. 3 and 6, is an integral, elongated element comprising a bottom wall 16, side walls 18 and end walls 22. In addition, a rib 26 extends along the longitudinal centerline of the bottom wall 16, and between the end walls 22. This rib is interrupted at its midpoint so that a space 28 is created for unimpeded containment of the terminal portion of a fastener for a face-plate (not shown). The side walls 18 are beveled, as indicated by the reference character 30, to support angularly the ends of ears 34 which extend outwardly and generally perpendicularly from the upper portions of the end walls 22.

Two elongated roofless chambers 38 and 40, with a space 28 therebetween, are formed by the rib 26 and the walls 18 and 22. Each of these chambers receives an electrical contact member 42 in a close, resiliently fitting relationship. The contact member 42 is best viewed in FIG. 4. Generally, it has a U-configuration including an elongated base 44 which is dished laterally upwardly toward its longitudinal centerline, so that laterally sloped portions 46 thereof terminate to form a slot 48. The legs 49 of the contact 42 rise from the base ends and terminate in contact fingers 50.

Triangular prism-like projections 52, integral with the bottom wall 16 of the base part 10 support the sloped portions 46 of each inserted contact 42. An opening 53 is provided in the bottom wall 16 through each prism 52 for the insertion of conductors (not shown), which are engaged in clamping relationship by the contact sloping portions 46. An analysis of the static forces which act to create this clamped relationship is not necessary because the clamping action of the contacts 42 does not form a part of the present invention. It is sufficient to note that once a conductor has been passed through an opening 53 into the slot 48 formed between the sloping portions 46 of a contact 42, engagement is effected by compressive forces exerted by the sloping portions 46 on the conductor in reaction to forces imposed by the conductor.

The end walls 22 are provided with vertical slots 54 in each chamber 38, 40 of the base part 10. The slots 54 cooperate with the fingers 50 of the inserted contacts 42 to receive prongs of conventional electrical plug devices (not shown), that can be extended through the cover 12 of the clamped receptacle.

The ears 34 of the base part 10 are provided with platforms 56 for supporting the locking member 14 to be described more fully hereinafter. Rectangular openings 60 are included in the ears 34 for passage of projections integral to the locking member 14.

A detailed description of the locking member 14 will now afford a better understanding of its relation to the base part 10. As viewed in FIGS. 1 and 2, the locking member 14 has an elongated body portion in the form of a strip 62, which has an expanded middle portion 64 having an opening 66. The opening 66 receives the aforementioned face plate securing screw which enters the cover part 12 and passes into the space 28 in the base 10. The strip 62 also has expanded portions 68 at its ends.

Each of the latter portions 68 comprises a shelf 70, in the plane of the strip 62, from which tab-like, base-clamping projections 72 extend perpendicularly downward, a riser 74, and a landing 76 from which tab-like, cover-clamping projections 78 extend substantially perpendicularly upward, as viewed in the drawings. The shelf 70 is rectangularly shaped and, in addition to the integral projections 72, a stabilizing wing or tab-like portion 80 extends coplanarly therefrom. The riser 74 extends upwardly from the shelf 70 at an angle so as to provide surface support for a similarly graded portion on the cover 12 yet to be more fully described. The riser 74 is somewhat wider than the strip portion 62 in order to provide strength for the locking member 14 to withstand stress incident to the static relationship between the strip 62 and the landing 76 when the clamped receptacle is supported for use. The landing 76 extends from the upper edge of the riser 74 in a plane generally parallel to the plane of the strip 62 and is T-shaped with a leg 82 extending in the same direction as the strip 62. A cross-piece 84 is, of course, transverse to the leg 82, and an opening 86 is made therethrough for passage of suitable fasteners for securing the wiring device to a metallic receptacle box or the like.

Figure 1:
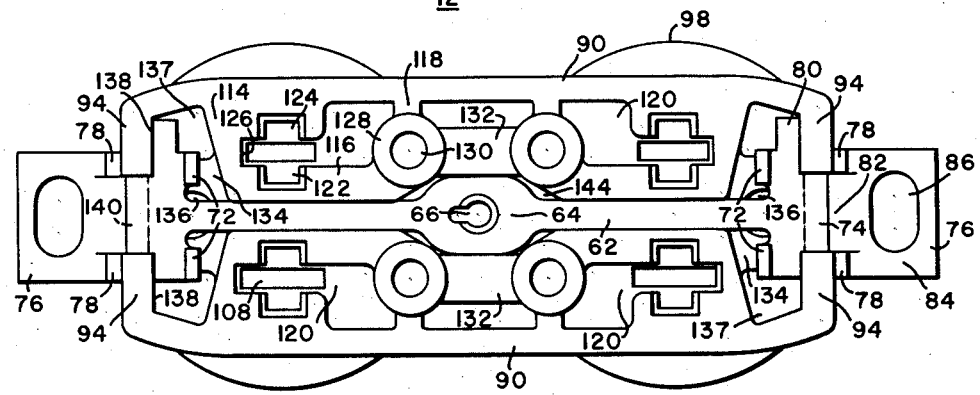
FIGURE 1 is a bottom plan view of a locking member assembled with a cover part of a duplex receptacle in accordance with the principles of the present invention.
Figure 2:
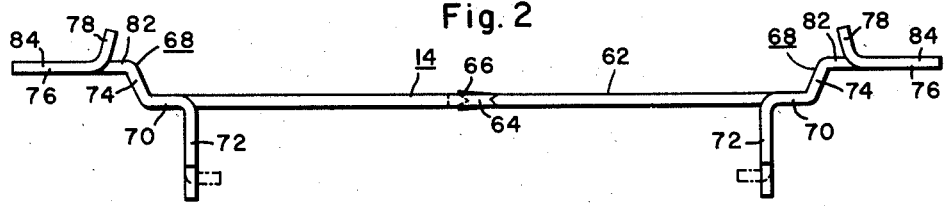
FIG. 2 is a side elevational view of the locking member illustrated in FIG. 1

The cover part 12 will best be described with relation to FIGS. 1, 3 and 7. It comprises a top surface 88, side walls 90, end walls 94 and a network of subsequently described partition ribs. Projecting faced portions 98 rise above the top surface 88 of the cover part and serve to guide and support ordinary male electrical plugs into conducting relationship with contacts 42 in the interior of the clamped receptacle. It is this feature which lends a "duplex" character to the assembled receptacle. An upper ledge 100 circumscribes each faced portion 98, and downwardly inclining and slightly rounded surfaces 102, 104, 106, extend from the ledge 100 to rectangular openings 108 (FIGS. 1 and 7), which allow the passage of plug prongs for electrical connection to the receptacle.

An opening 110 (FIG. 7) is provided for passage of the aforementioned face plate fastener. The fastener passes from the face plate through the cover part 12 into securing relationship with the locking member 14 in the opening 66 and thence, if necessary, into the space 28 in the base part 10. The top surface 88 also includes fringe portions 112 extending beyond faces 98 to receive the locking member projections 78 in a clamped relationship, yet to be described, between the cover part 12 and the locking member 14.

The side walls 90 of the cover part 12 are joined with ribs 114, 116, and 118 to form pockets 120. Vertical slots 122 and 124 are provided in the rib 116 and the side walls 90 to receive the previously described contact fingers 50 which extend into the cover part 12 from the base part 10 in the clamped receptacle. Additionally, slots 126 in the ribs 114 permit passage of the previously mentioned plug prongs. At the junction of the ribs 116 and 118, columns 128 are formed. The columns 128 have recesses 130 that extend nearly to the upper edge of sloped portion 46 of the contacts 42 in the clamped receptacle so that conductor ends extending from the base part through contacts 42 are received and insulated in the recesses 120. Ribs 132 are longitudinally extended to join adjacent pairs of columns 128 for reception of the middle portion 64 of the locking member 14. The strip portion 62 of the locking member 14 can be received in the space formed between parallel ribs 116 and the ends of the strip 62 and the shelves 70 of the locking member 14 can be positioned respectively against portions 134 (FIG. 1) integral to and extending down from each end of the top surface 88 of the cover 12. Each portion 134 has a recess 136 which can be employed in an alternative form of the invention described infra.

The ribs 114, the end walls 94, and the side walls 90 form pockets 137 which lend space for reception of the locking member shelves 70. In the clamped receptacle, the edges of the shelves 70 are positioned against the end walls 94, as indicated by the reference character 138. Additionally, each portion 134 has a sloped wall 140 which extends to the top surface 88 of the cover part 12 to be stationed against the adjacent riser 74 of the locking member 14 in the clamped receptacle.

The structures of the base and cover parts 10, 12 and of the locking member 14 which cooperate to form a duplex receptacle have been thus far described, and it remains only to relate the mode of cooperation between them in assembling and clamping the receptacle. The contacts 42 are first inserted into the base chambers 38 and 40. The locking member 14, sometimes termed a yoke in the wiring device art because of its collar-like action, is placed on the base part 10 so that the integral tab-like projections 72 extend through the openings 60 to the underside of the ears 34 of the base 10. The shelves 70 of the locking member 14 are then positioned on the platforms 56 and the strip portion 62 of the locking member 14 is stationed on the rib 26.

Following this operation, the cover part 12 is placed on the base 10 and the locking member 14. The side and end walls 90, 94 of the cover 12 bear against the side walls 18 and ears 34 of the base 10, while the ribs 114 extend adjacent to walls 142 of platforms 56 on the base 10 so that longitudinal movement of the cover 12 with respect to the base 10 is precluded. Additionally, the cover portions 134 clamp the shelves 70 of the locking member 14 against the base platforms 56 and a cover portion 144 clamps the strip 62 of the locking member 14 against the base rib 26. The ribs 116 and 132 of the cover 12 straddle the locking member strip 62 and extend below to straddle the base rib 26. The strip 62 is thereby substantially surrounded by insulating ribs so that there is no danger of its exposure to a higher electrical potential of the contact members 42 when the receptacle is placed in service.

As previously described, edges of the shelves 70 bear against the end walls 94, and the risers 74 bear against the sloped walls 140 of the cover 12. Accordingly, clamping action is readily attained for this assembled receptacle.

The tab like projections 78, extending substantially perpendicularly upward from the landing 76 of the locking member 14, are deformed toward and into the plane of the landings 76 to bear against the fringe portions 112 of the cover 12. The locking member 14 and the cover part 12 are, as a consequence, clamped together.

The integral tab-like projections 72 which extend through the ears 34 of the base 10 are then deformed through substantially a right angle at a point indicated by the reference character 146 where the projections 72 extend below the underside of the ears 34. The locking member 14 and the cover part 12 are thus securely clamped to the base part 10. The landing portions 76 extend longitudinally from the clamped receptacle and adapt it for mounting within, as one example, a conventional receptacle box. The aforementioned face or cover plate may be placed over the receptacle after mounting and secured thereto through the opening 110 by a fastener such as a screw.

In an alternative embodiment (FIG. 5) of the invention, a locking member 148 having multiple parts is substituted for the integral locking member 14. The member 148 comprises a strip 150 having an expanded middle portion 151, flared portions 152, and shelves 154. In a manner similar to that of the locking member 14, risers 156 are extended upwardly from the shelves 154 to landings 158 which have openings 159 and which include upstanding projections 160, as viewed in FIG. 5. However, a tab 162 is deformed perpendicularly from the riser 156 to a position above the shelf 154. An element 164 for cooperative engagement with the member 148 comprises vertical, integral projections 166 which are extended downwardly from a cross-bar 168, and arms 170 and 172 which are extended upwardly from the cross-bar 168 and which are bent at substantially right angles as indicated by the reference character 174, and then extended transversely of the bar 168, to join, at right angles as indicated by the reference characters 176, sections 177 extending parallel to the bar 168. The arms 170 and 172 are terminated to provide a space 178 therebetween.

Figure 8:
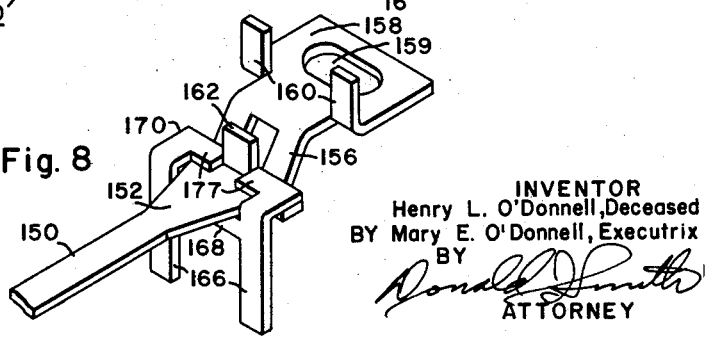
FIG. 8 is an isometric view of the alternative embodiment of the locking member of FIG. 5 in an assembled relationship.

In the assembly of the alternative embodiment of the invention, as shown in FIG. 8, the element 164 is slipped onto each end of the element 148 so that the bar 168 is positioned on the flared portion 152, and so that the projections 166 are positioned against sides 180 of the shelves 154. Thus, the arms 170 and 172 of the element 164 straddle the tab 162 of the member 148.

The assembled locking member 148 is placed on the base 10 so that the projections 166 pass through the openings 60 in the base ears 34. The contacts 42 are inserted in the base 10, and the cover part 12 is placed on the locking member 148 so that the stabilizing tabs 162 are received in the recesses 136. Deformation of the locking member projections 160 substantially through a right angle into the plane of the landings 158 and onto the fringe portions 112 of the cover part 12, followed by deformation of the tabs 166 substantially through a right angle against the underside of the ears 34 of the base part 10, creates a firmly clamped relationship between the base and cover parts 10, 12 to form the receptacle.

It is to be realized that the objects of the invention are fulfilled by the illustrated embodiments because the assembled wiring device comprises a minimum number of parts in a clamped relationship such that mechanical and electrical requirements are met without the use of any separate securing elements. The alternative embodiment does include added parts to comprise the locking member, but these added parts bear only nominal consideration with respect to cost reduction because machine assembly of the invention is facilitated therewith.

The invention herein disclosed has been illustrated in the form of a duplex receptacle, but it is not desired that it be construed as being limited thereto. Obviously, other wiring devices having different purposes and modified base, cover, and locking member structures may be designed without departing from the spirit of the invention. It is accordingly desired that the invention be limited only by the scope and spirit of its broad principles and not by the exemplary embodiments described here.

What is claimed is:

1. A wiring device comprising elongated insulating base and cover parts, and an elongated generally planar locking and mounting member extending longitudinally between said parts with end portions thereof extending longitudinally outwardly of the associated ends of said parts for mounting purposes, said locking member having adjacent each of its end portions one of at least a first pair of deformable tabs extending prior to final device assembly in one direction generally perpendicularly outwardly of the plane of said locking member for engagement with said cover part, one of at least another pair of deformable tabs being provided on said locking member adjacent each of its end portions and extending prior to final device assembly in the direction opposite said one direction and generally perpendicularly outwardly of the plane of said locking member for engagement with said base part, said cover part having a surface adjacent each of its ends facing said one direction and said base part having a surface adjacent each of its ends facing said opposite direction, said first pair of locking member tabs being deformed so as to extend longitudinally of said parts and engage said cover surfaces, respectively, and said another pair of locking member tabs being deformed so as to extend longitudinally of said parts and engage said base surfaces, respectively, to secure said wiring device in assembled relation.

2. A wiring device as set forth in claim 1, wherein said other pair of deformable tabs are provided on respective separate elements, each of said elements additionally having at least one tab extending longitudinally of said locking member and being engaged between said cover and said locking member.

3. A wiring device as set forth in claim 1, wherein said another pair of tabs are located further inwardly longitudinally of said locking member than said first pair of tabs are located.

4. A wiring device as set forth in claim 1, wherein respective openings generally perpendicular to said locking member are provided through said base part for receipt of said another pair of tabs and wherein said base surfaces respectively are located adjacent said openings.

References Cited in the file of this patent

UNITED STATES PATENTS

| | | |
|---|---|---|
| Re. 19,316 | Gaynor | Sept. 18, 1934 |
| 1,631,507 | Slade | June 7, 1927 |
| 1,882,080 | Hubbell | Oct. 11, 1932 |
| 2,231,976 | Von Holtz | Feb. 18, 1941 |
| 2,292,084 | Pistey | Aug. 4, 1942 |
| 2,294,896 | Eby | Sept. 8, 1942 |
| 2,315,523 | Hubbell | Apr. 6, 1943 |
| 2,890,265 | Smith | June 9, 1959 |

FOREIGN PATENTS

| | | |
|---|---|---|
| 468,905 | Canada | Oct. 24, 1950 |